Figure 1:
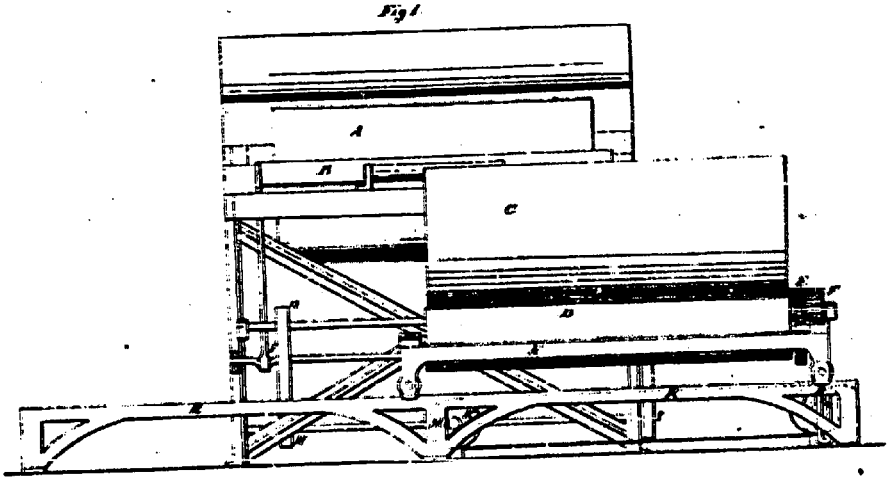
Figure 2:
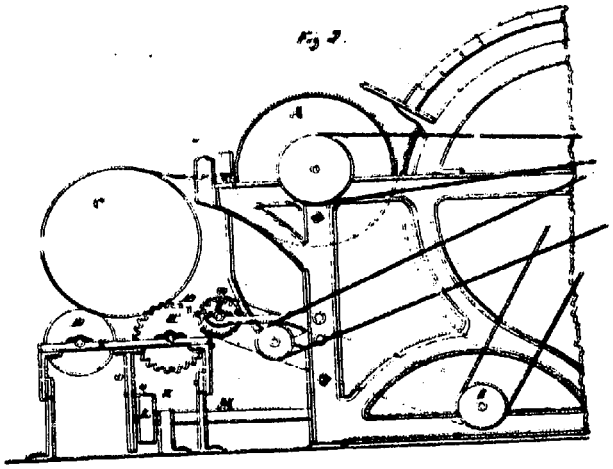

(12) United States Patent
Peck et al.

(10) Patent No.: X5547
(45) Date of Patent: Jun. 27, 1829

(54) CLOTH,ORNAMENTING, & C.

(76) Inventors: Nehemiah Peck; Daniel Taylor

N. Peck & Daniel Taylor of Fairfield County Connecticut
Letters Patent
The Schedule referred to in these Letters Patent and making part of the
same containing a description in the words of the said Nehemiah Peck
and Daniel Taylor themselves of their improvement in the mode of
manufacturing cloth without spinning or weaving & without crossing the wool.

To all to whom these presents shall come; Nehemiah Peck
and Daniel Taylor of the County of Fairfield and State of Con
necticut (Mechanics) send Greeting. Be it known that We
the said Nehemiah Peck and Daniel Taylor have invented con-
structed made and applied to use a new and useful improvement
in the mode of crossing the web of the carding machine for the pur
pose of making woollen felt cloths of every description in which
the crossing of the wool is necessary or useful specified in the
words following to wit
1st The wool to be worked into cloth or goods after being pick
ed and prepared in the common way is put into a common carding
machine and comes out in the form of a web or batting. This web
is received from the dofter of the carding machine by a cylinder
which revolves just fast enough to receive the bat or Web. This
cylinder is made to vibrate to and fro, alternately to the distance
the cloth is required to be in length. This cylinder may be
about four feet long more or less. and sixteen inches in diame-
ter, or may be larger or smaller according to the width of
the cloth required and may be made of either wood or iron
hollow or solid. This cylinder is made to rest in two small-
er cylinders which will be about the same length as the lar-
ger drum or cylinder they also cause the large cylinder to re-
volve by having sufficient power applied and bearing equal-
ly upon both sides of the large drum or cylinder they tend to
keep the bats or web firm in its place and cause the cloth to
be of more equal thickness of texture. 2nd. The revolving, Drawing made
[illegible]

motion is given to the cylinders above mentioned by means of
a cog wheel fixed to one end of the small cylinders above men-
tioned which cog wheel may be about six inches in diameter
made of wood or iron, and is made so as to mash into a flu-
ted roller or pinion which is to be about one and one half
feet in length and about four inches in diameter which may
be made of cast iron or wood or any other material, and is
to be turned by means of a shaft with a cog gear or by a
band with a pulley fixed under the carding machine and
this shaft may be connected to the main cylinder of the card-
ing machine by another band and pulley.

3rd The 3 cylinders before mentioned are supported by a frame
of sufficient length and width to receive them which frame may be
made of either three or four pieces of wood or iron about two
inches square. these are supported by four posts or legs which
may be about 6 inches long each leg or post being supplied
with a castor or roller about 3 inches in diameter compo-
sed of either wood or metal on which the frame and the cyl-
inders are moved or vibrated to and fro at right angles with
the carding machine to receive the web in a crossed or angular man-
ner being wound on the cylinder as it is made to move one
way and reversing the angles and wind as the frame and
cylinders move back.

4the. The frame or machine on which the rollers, and carriage
move to and fro, may be termed a rail way and may be made
of either iron or wood. and must be double the length of
the frame that rolls thereon. the said rail way must or
may be raised from the floor about ten inches to allow room
for the gearing that may be required between 5th The power which moves the carriage or frame back &
forward is applied from a shaft under the carding machine
by means of a cog wheel and gear and extends from this shaft
to the centre of the rail way underneath the same at right angles; The end of said shaft being supported by a proper bear-ing. at the extreme end of the said shaft is a pulley. over this pulley is a band which extends about four feet to another pulley. each pulley to be about 6 inches in diameter and may be made of either iron or wood.

Crosswise of this band is fixed a pin of either iron or wood, made to project about two inches from the edge of the band this pin being attached to the band is constantly moved with the same, a post or stud is fixed to one end of the frame or carriage the lower end of this stud or post is made with a slote or groove cut in the end about ten inches in length in which the pin attached to the band is placed and the band being put in mo-tion the pin moves the carriage or frame together with the cylinders thereon in a backward and forward direction, Mode of using the machine and manner of making the cloth. The wool cotton or hair being picked is weighed in proper portions for the size of the bats required and the weight of the cloth to the square yard after coming off the carding machine and being wound on the cylinder as be-fore described. It is then cut off lengthwise of the cylinder and proceed in the same way with others until a sufficient number is made to suit the length of the piece of cloth required.

The ends of these bats or webs being the thinnest are lapped to-gether and pinned on. The whole is then put between linen or tow cloth folded up and exposed to the steam of water until suf-ficiently steamed thro'. It is then placed under a common harden-ing machine now in general use for hardening and felting wool, after this the cloth may be fulled, and may be dyed and dressed in the common mode. What we particularly claim in the above improvement as our exclusive right in this Specification is the combi-nation of the above described machinery and the application of the same to crossing the wool either separate or with cotton or hair for the purpose of making Blankets, and all other descriptions of cloth and table spreads for which the crossing of the wool by machinery is useful or necessary without spinning or weaving.

We also claim the principle of crossing the wool, cotton, or hair by machinery. also the use of one or more carding machines placed in a row or at right angles, as applied to the making of cloth or felt out of wool; wool & cotton, or cotton alone. without spinning or weaving, and in the mode above specified by our machinery We also claim the above mode specified for hardening and the application of fulling as applied to the above description of felted cloth.

In witness whereof we have hereunto set our hands this twenty fifth day of April 1829.

Exd. Witnesses
[illegible] Chas. C. Ruggles
William Onderdonk Jr.

Nehemiah Peck
Daniel Taylor (1296 Words.)

(Patented 27 June 1829)

United States Patent

Patent No.: X5547

NO PRINTED SPECIFICATIONS AVAILABLE

*Peck & Taylor.*

*Forming Bats.*

*Patented Jun. 27, 1829*